United States Patent [19]
Ecoff et al.

[11] Patent Number: 5,595,103
[45] Date of Patent: Jan. 21, 1997

[54] HYDRAULIC DRIVE ASSEMBLY FOR ELECTRICAL DISCHARGE MACHINE

[76] Inventors: William B. Ecoff, 29439 Sierra Rojo La., Valley Center, Calif. 92082; William H. Bradbury, 2124 View Crest Glen, Escondido, Calif. 92026

[21] Appl. No.: 32,388

[22] Filed: Mar. 18, 1993

[51] Int. Cl.⁶ .................................................. F15B 13/02
[52] U.S. Cl. ........................................ 91/51; 92/165 PR
[58] Field of Search .......................... 91/51; 92/165 PR

[56] References Cited

U.S. PATENT DOCUMENTS

| | | | |
|---|---|---|---|
| 2,759,459 | 8/1956 | Lucien | 91/51 |
| 2,983,278 | 5/1961 | Heintz | 91/51 |
| 3,087,471 | 4/1963 | Ray | 91/48 |
| 3,492,921 | 2/1970 | Ray | 91/51 |
| 3,537,355 | 11/1970 | Bliss | 91/51 |
| 4,555,979 | 12/1985 | Cetnarowski | 92/165 PR |

OTHER PUBLICATIONS

"Cutting With A Spark", James Sanford, *American Machinist*, Special Report No. 590, Jul. 4, 1966.
"Understanding the EDM Process", Ernst Lussi, American Society of Tool and Manufacturing Engineers, Engineering Conferences Technical Paper, 1968.

*Primary Examiner*—F. Daniel Lopez
*Attorney, Agent, or Firm*—Brown, Martin, Haller & McClain

[57] ABSTRACT

A hydraulic drive system for positioning a part such as the electrode of an electrical discharge machine includes a hydraulic cylinder and a piston slidably mounted in the cylinder and separating it into opposite first and second chambers on opposite sides of the piston. A piston rod extends from the piston through one end of the cylinder for connection to a part to be positioned. A reservoir containing hydraulic fluid is mounted on the cylinder, and a pump has an inlet communicating with the reservoir and an outlet connected via passageways to the first and second chambers. Return passageways are provided for returning fluid from the chambers to the reservoir, and valves control fluid flow from the pump to the chambers and back from the chambers to the reservoir in order to drive the piston in opposite directions. The reservoir, pump, valves, and at least part of each connecting passageway are located within a single outer housing.

10 Claims, 3 Drawing Sheets

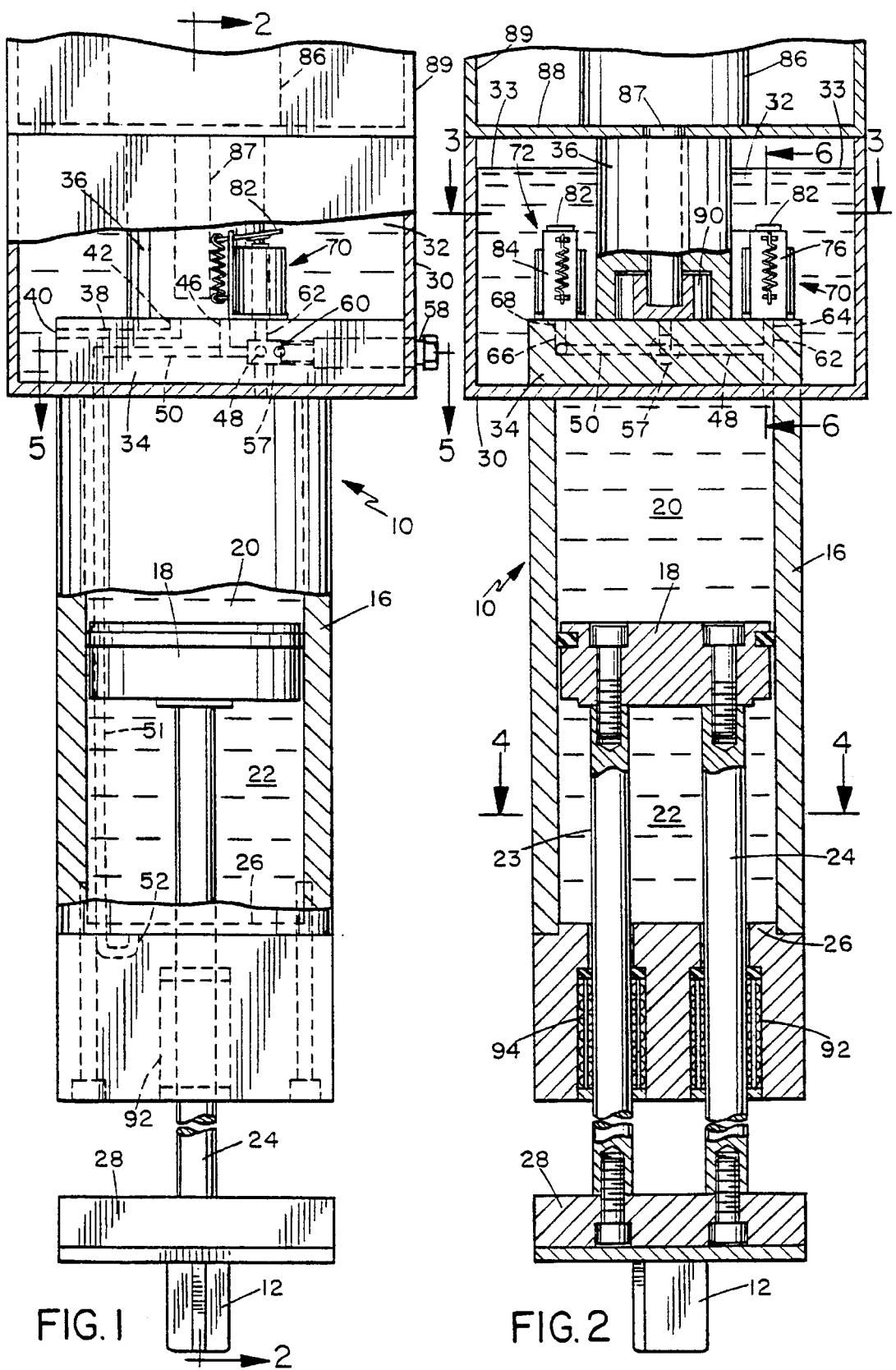

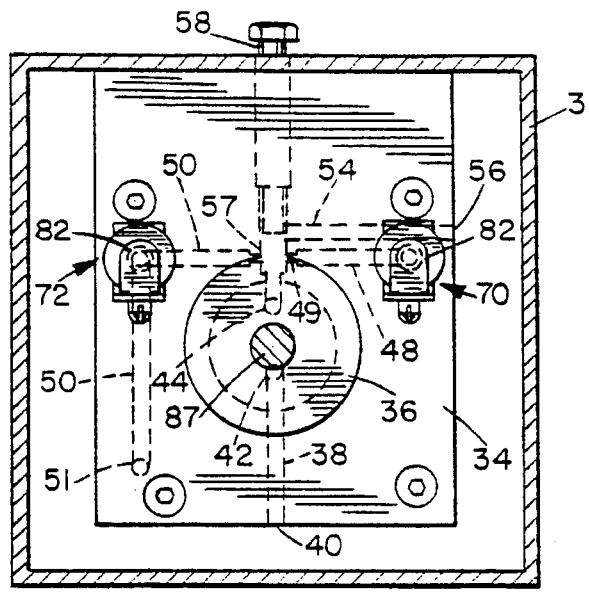
FIG. 3
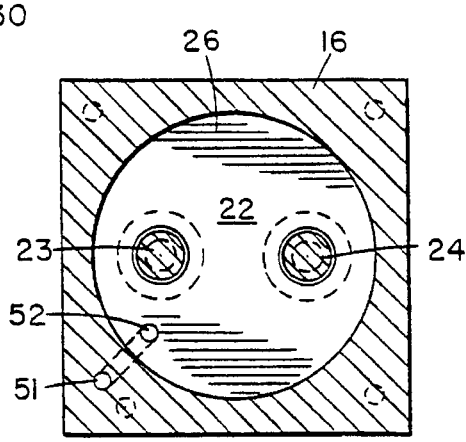
FIG. 4
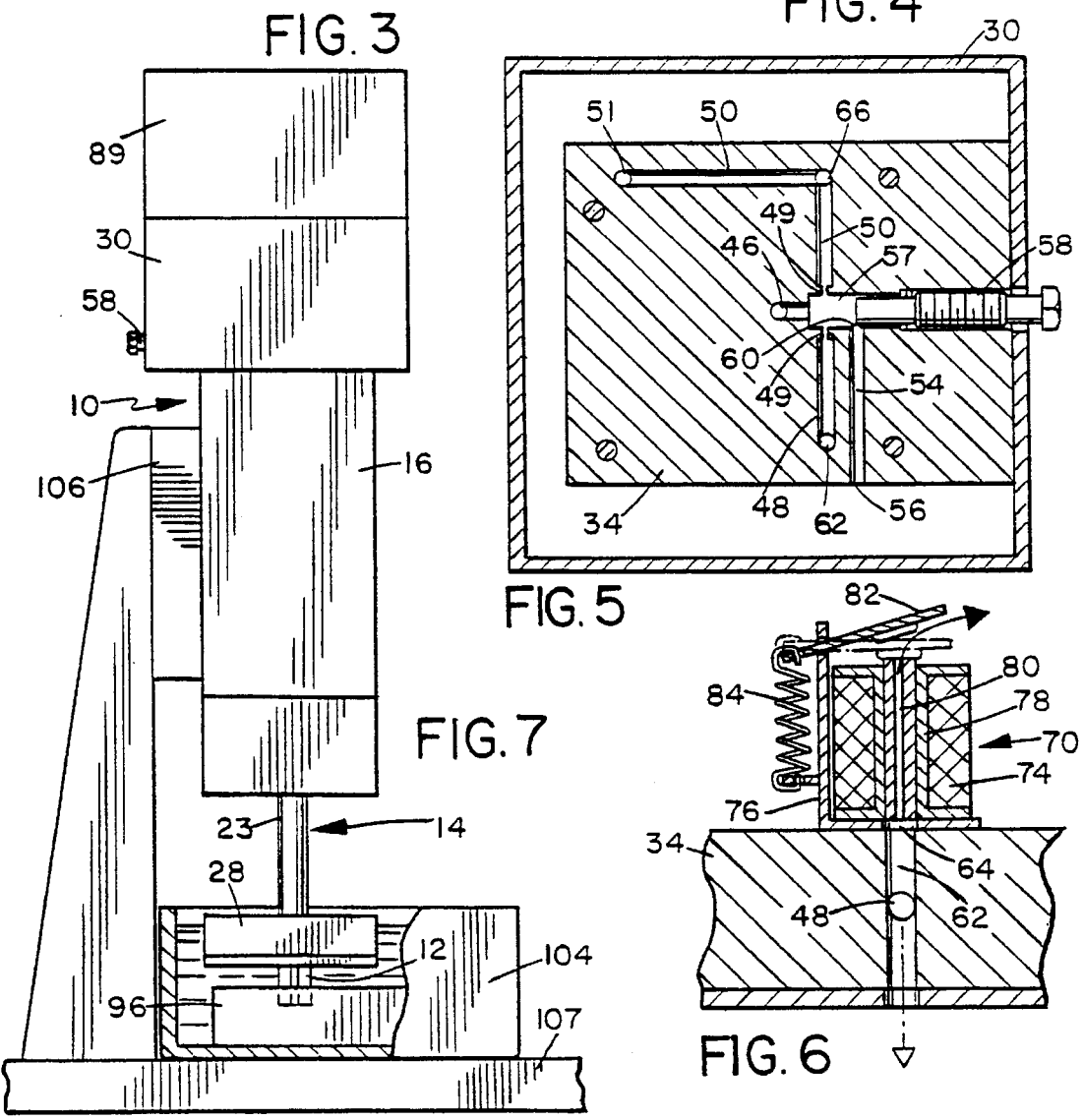
FIG. 5
FIG. 7
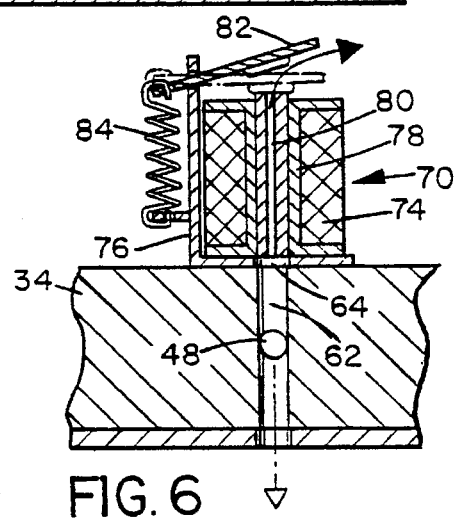
FIG. 6

5,595,103

HYDRAULIC DRIVE ASSEMBLY FOR ELECTRICAL DISCHARGE MACHINE

BACKGROUND OF THE INVENTION

The present invention relates generally to hydraulic drive systems of the type used for advancing and retracting a ram for controlling positioning of a workpiece or the like, and is particularly concerned with a hydraulic drive assembly for positioning the electrode of an electrical discharge machine.

In a typical hydraulic drive system, a supply of hydraulic fluid is provided from a reservoir to a pump inlet. The pump outlet is connected via input lines to opposite ends of a hydraulic cylinder, with control valves for selectively cutting off the supply of fluid to respective ends of the cylinder. Return lines are provided from each end of the cylinder to the reservoir, with control valves for controlling the connection of the respective ends of the cylinder to the reservoir. A piston in the cylinder moves back and forth in response to the supply of pressurized fluid to opposite ends of the cylinder, and is connected to a ram extending out of the cylinder for positioning a workpiece, machine part, or the like. This is a four way system including four connecting lines and corresponding valves between the pump, cylinder and reservoir, and a connecting line from the reservoir to the pump. Such systems are typically bulky, expensive, and have relatively slow response times.

Hydraulic drive systems of this type have been used in the past for controlling the positioning of an electrode of an electrical discharge machine, for example, although they were not ideal for this purpose in view of their size, expense, and relatively slow operation.

In a typical electrical discharge machine, a power supply or control circuit applies a pulsed waveform between an electrode immersed in a bath of liquid dielectric and a workpiece positioned below the electrode. When the gap between the electrode and workpiece is at an optimum distance, a spark traverses the gap and material is removed from the workpiece. The spark will occur again on the next voltage pulse if the optimum gap is maintained. A servo system is used to maintain the desired gap spacing. The voltage across the gap is detected, and is compared to the optimum voltage corresponding to the desired gap spacing. If the gap voltage is too small, the servo mechanism moves the electrode up. Conversely, if the detected gap voltage is too large, the electrode is moved down. The servo mechanism used is either of the lead screw ram type or a hydraulic system. These have the disadvantage of being relatively slow, and are generally large and expensive machines. A typical hydraulic system will be relatively slow to respond to a control signal to drive the electrode up or down, and is also prohibitively large and expensive for all but very large machine shops.

SUMMARY OF THE INVENTION

It is an object of the present invention to provide a new and improved hydraulic system for controlling the position of a piece of machinery, such as the electrode of an electrical discharge machine.

According to one aspect of the present invention, a hydraulic feed or drive system is provided, which comprises a hydraulic cylinder, a piston slidably mounted in the cylinder to separate the cylinder into first and second chambers on opposite sides of the piston, a piston rod extending from the piston through one end of the cylinder for connection to an item to be positioned, a reservoir containing hydraulic fluid, a pump having an inlet connected to the reservoir and an outlet, a first passageway connecting the pump outlet to the first chamber, a second passageway connecting the pump outlet to the second chamber, a first return passageway connecting the first passageway to the reservoir, a first vent valve in the first return passageway, a second return passageway connecting the second passageway to the reservoir, a second vent valve in the second return passageway, the first and second return passageways being of smaller cross-sectional dimensions than the first and second passageways, and a controller for controlling the first and second vent valves to close the first vent valve and open the second vent valve in order to drive the piston in a first direction, and the controller opening the first vent valve and closing the second vent valve in order to drive the piston in a second direction opposite to the first direction.

Preferably, the first and second return passageways and at least part of the first and second passageways are provided in a connecting manifold mounted in the reservoir, and the pump is mounted on top of the manifold with its outlet connected to the first and second passageways within the manifold. The vent valves therefore vent fluid directly into the reservoir. This arrangement considerably reduces the length of connecting pipes to and from the reservoir and hydraulic cylinder, and therefore also speeds up the response time of the system. It also considerably reduces the size and weight of the hydraulic system.

The reservoir may be mounted directly at the end of the hydraulic cylinder opposite to the piston rod, with the manifold mounted in the base of the reservoir and connected directly through the end wall of the cylinder into the first chamber.

Preferably, a pressure relief outlet in the manifold connects the pump outlet directly to the reservoir, and a pressure relief valve controls the size of the outlet and thus the pressure in the system.

The system operates as a pressure differential, controlled leak system. With constant input and both vent valves open, fluid will flow from both supply passageways back to the reservoir, and a pressure balanced condition will be achieved. When the first vent valve is closed, more fluid will flow along the first passageway into the first chamber, since fluid will be redirected from the closed return passageway. This will tend to move the piston, forcing fluid back along the second passageway and out of the second return passageway. This allows the same passageways or connecting lines to be used for fluid supply to the cylinder and return from the cylinder, also reducing the size and complexity of the hydraulic system.

Preferably, each of the vent valves is a solenoid valve comprising a solenoid coil, a metal slug or core in the center of the coil, the core having a through bore, and a flapper member pivotally mounted at one end of the coil for movement between a closed position closing the end of the through bore and an open position pivoted away from the through bore. In a preferred embodiment, the flapper member is biased by a spring or the like into its normal, open position, and is pulled into its closed position when the solenoid coil is energized. The solenoid is mounted on the manifold over the outlet end of the return passageway, so that fluid flows directly through the solenoid core when the flapper member is open. By placing the flapper member directly on the end of the solenoid and providing flow through the solenoid itself, operation of the valve will be much faster than with a conventional solenoid valve.

The hydraulic system of this invention may be used, for example, to control the position of an electrode of an electrical discharge machine in order to accurately control the size of the spark gap. This will provide an electrical discharge machine which is much more compact and lightweight than conventional machines, is less expensive, and which can be used in smaller machine shops than traditional electrical discharge machines. The hydraulic system can also be used in other applications for controlling position of various mechanisms. The solenoid valve of this invention is particularly useful in such a hydraulic system, although it may advantageously be used in other types of hydraulic and pneumatic systems.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 is a side elevational view, partially cut away, of a hydraulic system according to a preferred embodiment of the present invention;

FIG. 2 is a section on the lines 2—2 of FIG. 1;

FIG. 3 is a section on the lines 3—3 of FIG. 2;

FIG. 4 is a section on the lines 4—4 of FIG. 2;

FIG. 5 is a section on the lines 5—5 of FIG. 1;

FIG. 6 is a section on the lines 6—6 of FIG. 2;

FIG. 7 is a side elevational view, partially broken away, of an electrical discharge machine incorporating the hydraulic system of FIGS. 1–6.

DESCRIPTION OF THE PREFERRED EMBODIMENT

Figure 8:
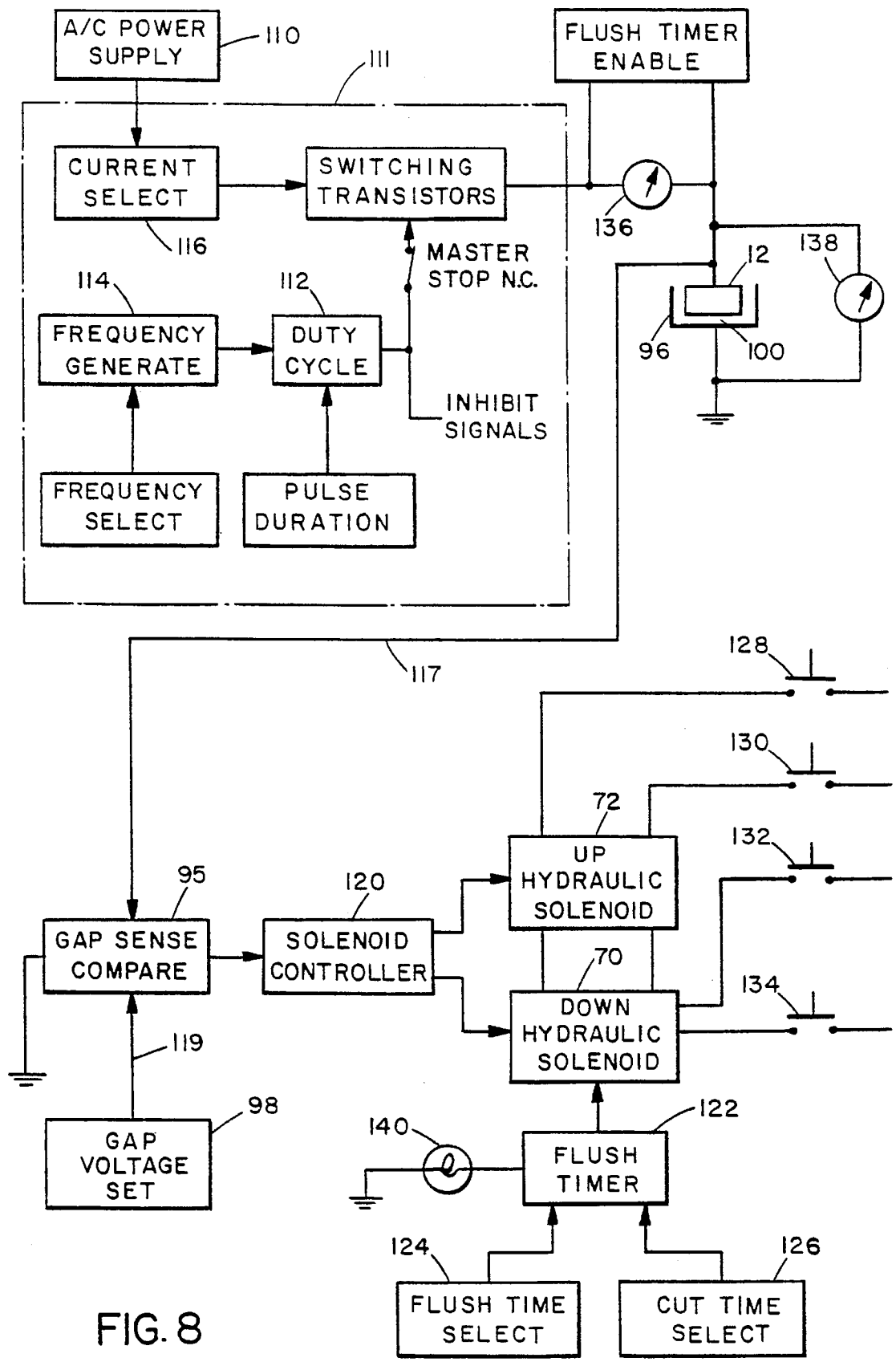
FIG. 8 is a schematic block diagram of the power and control circuitry for the machine.

FIGS. 1–5 of the drawings illustrate a hydraulic positioning or feed system 10 according to a preferred embodiment of the present invention. The system may be used, for example, to control the position of an electrode or electrode holder 12 of an electrical discharge machine 14, as schematically illustrated in FIG. 7. However, it will be understood that this is just one example of many possible uses for the hydraulic system of this invention, which may be used for positioning parts of other types of machines or in any application involving hydraulics.

As best illustrated in FIGS. 1 and 2, the hydraulic system 10 basically comprises a hydraulic cylinder 16 in which a piston 18 is slidably mounted to separate the cylinder into first and second pressure chambers 20, 22, and piston rods 23, 24 extending from the piston 18 through one end 26 of the cylinder and secured to a workpiece holder 28 for holding an item or workpiece to be positioned, such as the electrode 12 of an electrical discharge machine. A reservoir 30 for holding hydraulic fluid 32 up to a normal level 33, is mounted at the opposite end of the cylinder to piston rods 23 and 24. A connecting manifold 34 is mounted in the base of the reservoir, and a pump 36 such as a gear pump is mounted on top of the manifold.

The connecting manifold contains internal passageways for connecting the pump inlet to the reservoir and the pump outlet to each of the chambers 20 and 22, as best illustrated in FIGS. 1, 3 and 5. An inlet passageway 38 has an open end 40 at one side of the manifold and extends from end 40 to the pump inlet 42. The pump outlet 44 is positioned over bore 46 which has an open end on the upper surface of the manifold and connects to first and second passageways 48 and 50. The first passageway 48 extends down through the base of the reservoir and the end of the cylinder to connect to the interior of chamber 20. The second passageway 50 includes a portion 51 extending along the wall of the cylinder to an outlet 52 in the second chamber 22, as illustrated in FIGS. 1 and 4.

The pump outlet 44 also communicates with relief passageway 54 having an open outlet end 56 at one side of the manifold (see FIG. 5) via connecting passageway 57. A spring-loaded pressure relief valve 58 extends through the side wall of the reservoir into passageway 57 and partially across the end of pressure relief passageway 54 so as to control the size of the outlet orifice 60 into passageway 54. The relief valve 58 is adjustable to control the size of outlet orifice 60.

A first return passageway 62 in the manifold connects the first passageway 48 to the reservoir via an opening 64 in the top of the manifold, as best illustrated in FIGS. 2 and 6. Similarly, a second return passageway 66 connects the second passageway 50 to the reservoir via an opening 68 in the top of the manifold. First and second vent valves 70, 72, respectively, are mounted over the openings or open ends of the return passageways 62 and 66 to close these passageways when the valves are in the closed position. First and second vent valves are mounted below the normal level of fluid in the reservoir.

The vent valves 70 and 72 are identical and like reference numerals have been used for like parts. As best illustrated in FIG. 6, each of the vent valves 70 and 72 preferably comprises a solenoid coil 74 mounted over the open end of the respective return passageway via mounting bracket 76, the coil 74 having a central core or slug 78 having a small central through bore 80 aligned with the return passageway. A flapper valve 82 of magnetic material is pivotally mounted across the end of core 78, and is biassed by spring 84 into the open position. When flapper valve 82 is open, fluid can flow directly into the reservoir through bore 80, as indicated by the arrow in FIG. 6.

When the coil 74 is energized, the core 78 will be magnetized and will attract the flapper valve 82 downwardly against the action of spring 84, into the closed position illustrated in dotted lines in FIG. 6, sealing off the end of bore 80. This solenoid valve is unique, since instead of using a solenoid coil as an actuator for actuating a separate valve member to close or open a remote passageway, the solenoid itself acts as part of the valve and the valve member is mounted directly on the end of the solenoid, so that fluid flows directly through the solenoid itself when the valve is open. This solenoid valve will therefore operate much faster than conventional solenoid-operated valves, which will be useful in a number of possible applications, not limited to hydraulic systems of the type illustrated in the drawings. As best illustrated in FIG. 6, the through bore 80 is of smaller diameter than that of return passageway 62, and is preferably of the order of ¼ the diameter of passageway 62.

The pump is operated by a motor 86 mounted on support plate 88 in an outer housing 89 above the level of fluid in reservoir 30, with a drive rod 87 extending through an opening in plate 88 and connected to rotating gear member 90, as best illustrated in FIG. 2. The pump motor 86 may have cooling coils (not illustrated) supplied with fluid from reservoir 30.

The piston rods or rams 23 and 24 extend slidably through linear bearings 92, 94 in end wall 26, which helps to ensure that the rods move on axis with no lateral displacement. The provision of two spaced rods secured to holder 28 also helps to reduce or eliminate wobbling or other lateral displacements. This is important in situations where the hydraulic system is being used for accurate control of the size of a small spark gap, for example, where any lateral displacement of the electrode would cause inaccuracies in the cutting of a workpiece.

Operation of the hydraulic system will now be described in more detail. It is a pressure differential system in which both vent valves are normally open, so that equal amounts of fluid flow to both sides of the circuit. Thus, with both vent valves open, there will be a controlled leakage of fluid out of both return passageways. Closing of either one of the vent valves causes a pressure differential in which fluid is redirected from the closed return passageway into the connected chamber of the cylinder, so that more fluid will tend to flow to that side of the circuit. Thus, for example, if the first or down vent valve 70 is closed, the fluid output from the pump directed to that side of the circuit will all be redirected into first passageway 48. This fluid will flow into chamber 20, tending to push the piston 18 downwards and forcing fluid out of chamber 22 and into the second passageway 51 and 50. Fluid entering passageway 50 will be vented through valve 72 directly into the reservoir.

Similarly, if the second or up vent valve 72 is closed, fluid output from the pump on that side of the circuit will all flow along the second passageway 50 and 51, and out via outlet 52. Thus, more fluid will flow into the lower chamber 22 than upper chamber 20, pushing the piston 18 upwards and returning fluid from chamber 20 through passageway 48 and out into the reservoir through valve 70. Thus, closing of vent valves 70 and 72 will control movement of piston 18, adjusting the position of an electrode 12 or other item of machinery secured to the piston rods or rams 23 and 24.

The size of the orifice 60 into the pressure relief passageway 54 will control the pressure in the system. Some of the fluid output from the pump will always leak out through passageway 54, the amount of leakage being controlled by the relative sizes of the orifices defined by variable orifice 60 and passageways 48 and 50. The pressure relief valve 58 is adjusted according to the desired operating pressure.

The vent valves will be controlled via a suitable electronic controller depending on the requirements of the machine to be driven by the hydraulic system. FIGS. 7 and 8 of the drawings illustrate one possible application of the hydraulic system of this invention to an electrical discharge machine. FIG. 8 illustrates a control circuit for controlling operation of the solenoids of valves 70 and 72 depending on the output of a detector 95, which in this case is a comparator for comparing the actual voltage between electrode 12 and a workpiece in a holder 96 and a selected gap voltage set by adjustment dial 98.

Apart from the hydraulic positioner or feed system 10, the electrical discharge machine 14 is of a conventional type. The circuit of FIG. 8 comprises the control circuitry for controlling operation of valves 70 and 72, and also the power supply circuitry for supplying power between the electrode 12 and workpiece holder 96 so as to produce sparks across the gap 100 between the electrode and workpiece. The power supply and control circuitry may be suitably mounted in the reservoir housing 89, above plate 88. The machine also includes a conventional dielectric bath 104 in which the electrode 12 and workpiece holder 96 are submerged, and a flushing system (not illustrated) for flushing the gap 100 to sweep material removed from the workpiece from the gap. The system may be suitably supported on the overarm 106 of a milling machine or the like, with the bath 104 positioned on the table 108 beneath arm 106, as illustrated in FIG. 7.

A power supply 110 is connected via conditioning circuitry 111 across the electrode gap. The pulse width, frequency and the current can be set by selectors 112, 114 and 116, respectively. The voltage 117 detected across the gap 100 is input to comparator 95. The optimum gap voltage is set at any desired level between 10 volts and 150 volts by selector 98, and this optimum voltage is provided as the second input 119 to comparator 95. Any variation between the actual or detected gap voltage 117 and the desired gap voltage 119 will result in one or other of the solenoid valves 70 and 72 being operated by controller 120 in order to adjust the size of the gap, and thus the gap voltage.

The circuit of FIG. 8 also includes a flush timer 122 and selectors 124 and 126 for controlling the flush time and cut time, respectively. Manual override switches 128, 130, 132 and 134 are provided for manual control of the valves 70 and 72. Current and voltage indicators 136, 138 are also preferably provided on the front face of housing 89, along with all selector dials and a flush indicator lamp 140.

If the detected gap voltage is higher than the desired voltage, it indicates that the electrode is too far away from the workpiece. Controller 120 will then actuate down solenoid valve 70 to close this valve, so that more pump output fluid is supplied to the upper chamber 20 than the lower chamber 22, moving the piston and thus the electrode 12 downwards and reducing the size of the spark gap. Once the detected gap voltage equals the desired voltage, the controller 120 opens both the up valve 70 and down valve 72.

If the detected gap voltage is lower than the desired voltage, it indicates that the electrode is too close to the workpiece. The controller will then actuate up solenoid valve 72, so that the valve 72 closes and additional pump output fluid is supplied to the lower chamber 22 and vented from upper chamber 20 to the reservoir. The piston thus moves upwardly, and the attached electrode 12 also moves up to increase the size of the gap until the gap voltage is equal to the desired gap voltage. At this point, both solenoid valves are deactivated so that the respective flapper members open to provide a controlled leakage, and the pressure is thereby balanced to maintain the electrode in the optimum position.

This arrangement provides a fast operating hydraulic system which is capable of moving the electrode of an electrical discharge machine, for example, within 5 milliseconds, which is much faster than conventional hydraulic servo systems. By mounting the pump and vent valves on a single manifold containing the necessary connecting passageways and locating the manifold actually within the reservoir, the hydraulic system can be made much more compact and lightweight than conventional hydraulic systems including lengthy connecting pipelines between various separate components. The connecting passageways are also made considerably shorter than in conventional hydraulic systems, speeding up operation of the system considerably. The solenoid vent valves in which the through bore is provided in the solenoid itself and the flapper valve is mounted directly on the end of the solenoid will also operate much faster than conventional solenoid operated valves. Thus, the hydraulic system of this invention can change direction in a very short time.

Although a preferred embodiment of the invention has been described above by way of example only, it will be understood by those skilled in the field that modifications may be made to the disclosed embodiment without departing from the scope of the invention, which is defined by the appended claims.

We claim:

1. A hydraulic system, comprising:

a hydraulic cylinder having opposite first and second ends;

a piston slidably mounted in the cylinder to separate the cylinder into first and second chambers on opposite sides of the cylinder;

at least one piston rod extending from the piston through the second end of the cylinder for connection to an item to be positioned;

a reservoir containing hydraulic fluid;

a pump having an inlet connected to the reservoir and an outlet for pressurized fluid;

a first passageway connecting the pump outlet to the first chamber;

a second passageway connecting the pump outlet to the second chamber;

a first return passageway connecting the first passageway to the reservoir;

a second return passageway connecting the second passageway to the reservoir;

first and second vent valves in the first and second return passageways, respectively, for selectively opening and closing the respective return passageways;

a controller connected to the first and second vent valves for normally providing a controlled leak condition in which both valves are open, closing the first valve and opening the second valve whereby additional fluid is supplied along the first passageway to the first chamber in order to move the piston in a first direction and fluid is returned from the second chamber through the second passageway and second return passageway into the reservoir, and opening the first valve and closing the second valve whereby additional fluid is supplied along the second passageway to the second chamber in order to move the piston in a second direction opposite to the first direction, and fluid is returned from the first chamber along the first passageway and first return passageway to the reservoir; and a connecting manifold mounted in the reservoir, the connecting manifold having an inlet connected to the pump output, the first and second passageways being located at least partially within the connecting manifold and communicating with said manifold inlet, and the first and second return passageways being located within the connecting manifold and having outlets on an outer surface of the manifold beneath a normal level of fluid in the reservoir, the first and second vent valves being mounted on the respective return passageway outlets beneath the normal level of fluid in the reservoir to allow fluid to leak directly into the reservoir when the valves are open.

2. The system as claimed in claim 1, wherein the pump is mounted on the connecting manifold within the reservoir, the connecting manifold having a pump inlet passageway connecting the reservoir to the pump inlet, and the pump outlet being aligned with the connecting manifold inlet.

3. The system as claimed in claim 1, wherein the reservoir has a base wall secured across the first end of the cylinder, the manifold is mounted on the base wall, and the first passageway extends through the base wall into said first chamber.

4. The system as claimed in claim 1, including a pressure relief passageway connecting the pump outlet to the reservoir, the pressure relief passageway defining a relief orifice, and a pressure relief valve for adjusting the size of said relief orifice.

5. The system as claimed in claim 1, wherein the second end of said cylinder comprises an end wall which is thicker than the opposite, first end of said cylinder, the end wall having a pair of through bores, linear bearings in said through bores, a pair of piston rods extending slidably through the respective linear bearings and having outer ends outside the cylinder, and a holder for holding a part to be positioned secured to the outer ends of both piston rods.

6. The system as claimed in claim 1, wherein each vent valve comprises a solenoid coil, a central core of magnetizable material in said coil, the central core having a through bore defining said vent orifice, the through bore having a first end communicating with the respective return passageway and a second end communicating with said reservoir, a flapper valve member pivotally mounted across the end of said through bore for movement between a closed position covering the second end of said through bore and an open position spaced from said second end to allow fluid flow through the bore into the reservoir, and biassing means for biassing said flapper valve member into the open position, said solenoid coil comprising means for magnetizing said core to attract said flapper valve member into said closed position when said coil is energized.

7. A hydraulic system for positioning a part, comprising:

a hydraulic cylinder having opposite first and second ends;

a piston slidably mounted in the cylinder to separate the cylinder into first and second chambers on opposite sides of the piston;

at least one piston rod extending from the piston through the second end of the cylinder for connection to a part to be positioned;

a reservoir for hydraulic fluid, the reservoir having a base wall secured across the first end of the cylinder;

a pump mounted in said reservoir having an inlet opening into said reservoir and an outlet;

a first connecting passageway connecting the pump outlet to the first chamber;

a second connecting passageway connecting the pump outlet to the second chamber;

first and second return passageways for returning fluid from the first and second chambers, respectively, to the reservoir;

valve means for selectively controlling the supply of fluid from the pump outlet to the chambers and from the chambers back to the reservoir, whereby in a first valve condition fluid flows into the first chamber and from the second chamber to the reservoir in order to move the piston in a first direction, and in a second valve condition fluid flows into the second chamber and is vented from the first chamber to the reservoir in order to move the piston in a second, opposite direction; and a connecting manifold mounted within said reservoir on said base wall, the connecting manifold having an outer surface and at least five openings on said outer surface, the pump being mounted on said manifold with the pump inlet aligned with a first of said openings and the pump outlet aligned with a second of said openings, the valve means comprising a first vent valve mounted on said manifold over a third of said openings and a second vent valve mounted on said manifold over a fourth of said openings each vent valve having an outlet directly exposed to fluid in said reservoir, the manifold having an inlet passageway for supplying fluid to the pump extending from a fifth of said openings to said first opening, said first and second connecting passageways extending at least partially within said manifold to said second opening, and said first and second return passageways extending at least partially within said manifold to said third and fourth openings, respectively.

8. The system as claimed in claim 7, wherein said first and second return passageways are connected to said first and second connecting passageways, respectively.

9. The system as claimed in claim 7, wherein each of said vent valves comprising a solenoid coil, a central slug of magnetizable material mounted in said coil, the slug having a central through bore connected to the respective return passageway at one end, a valve member adjustably mounted over the opposite end of said slug for movement between a closed position closing the through bore when said solenoid coil is energized, and an open position spaced from the end of said slug when said coil is off, and biassing means for biassing said valve member into said open position.

10. The system as claimed in claim 7, including a unitary outer housing containing said reservoir, pump, said valve means, and at least portions of said connecting and return passageways.

* * * * *